United States Patent

[11] 3,537,522

[72] Inventor Bobby G. Harnsberger
 Houston, Texas
[21] Appl. No. 786,368
[22] Filed Dec. 23, 1968
[45] Patented Nov. 3, 1970
[73] Assignee Texaco Inc.
 New York, New York
 a corporation of Delaware

[54] SAND CONSOLIDATION METHOD
 7 Claims, No Drawings
[52] U.S. Cl. .................................................. 166/295
[51] Int. Cl. ...................................................... E21b 33/13
[50] Field of Search ........................................ 166/295,
 300, 276; 260/33.4, 29.1, 33.6

[56] References Cited
 UNITED STATES PATENTS
3,210,310 10/1965 Holbert et al. ................. 166/295X

| | | | |
|---|---|---|---|
| 3,227,688 | 1/1966 | Kern et al. ..................... | 166/295 |
| 3,247,900 | 4/1966 | Perry et al. .................... | 166/295X |
| 3,285,339 | 11/1966 | Walther et al. ............... | 166/295 |
| 3,294,165 | 12/1966 | Meijs et al. .................... | 166/295 |
| 3,297,087 | 1/1967 | Spain.............................. | 166/295 |
| 3,310,111 | 3/1967 | Pavlich et al. ................ | 166/295 |

Primary Examiner—Stephen J. Novosad
Attorneys—K. E. Kavanagh and Thomas H. Whaley ABSTRACT: Method of and composition for the treatment of unconsolidated sandy formations to stabilize the formation comprising injecting a treating composition of 2-25 percent of acrolein dimer and 75-98 percent of an aromatic type solvent into said formation, effecting polymerization of said dimer by contact with an acid forming polymerization catalyst and water, and formation of a fluid permeable consolidated sand in said formation.

SAND CONSOLIDATION METHOD

The present invention relates to the treatment of permeable underground formations. More particularly, the present invention relates to a method of treating permeable underground oil and/or gas containing formations to stabilize the sandy portion thereof and to a treating composition useful in the stabilization of incompetent sand containing underground formations.

The recovery of fluids such as gas and/or oil from underground formations has been troublesome in areas wherein the underground formation is composed of one or more incompetent sand containing layers or zones. The sand particles in the incompetent zone and/or layer tend to move or migrate to the well bore during recovery of the formation fluids from the particular zone and/or layer and frequently the moving sand particles block the passageways leading to the well bore. Plugging or materially impairing the flow of the formation fluids toward the bore hole results in a loss of these fluids to the producer or so decreases the rate of oil recovery from the well as to cause the well to be shut down because it is economically unattractive to continue to produce therefrom. An additional adverse factor resulting from the movement of the sand particles toward the well bore is that they are often carried along with the formation fluids to the well bore and passed through the pipes, pumps, etc. being used to recover the formation fluids to the surface with resulting damage to the moving parts thereof as the said particles are very abrasive.

Many attempts have been made heretofore to prevent or decrease the flow of undesirable sand particles from the formation into the production tubing and associated equipment, such as by the placement of sand screens, filters, liners and so forth. These prior attempts have been unsuccessful for a number of reasons among which is that these mechanical devices fail to prevent completely the flow of the formation particles into the production equipment. In addition these devices interfere with various types of completion and workover operations. In recent years, the industry has attempted to avoid the difficulties encountered in the use of mechanical devices by employing various chemical compositions to effect consolidation of the underground incompetent formations. These methods have generally consisted of injecting into the underground formation polymerizable resinous materials which when subsequently polymerized form permeable barriers in the formation to prevent the sand particles from movement therethrough. However, this technique of sand consolidation has not met with widespread acceptance because of the inherent difficulties of effecting polymerization of the resinous materials in the formation to a degree sufficient to consolidate these underground formations and yet permitting the unobstructed flow of the desirable formation fluids therethrough. Further, the cost associated with these resin coating methods has been relatively high in comparison with the prior mechanical methods and the time required for resin polymerization is often rather lengthy at low temperatures.

By the method of the present invention one is able to treat effectively the underground formation to be stabilized in a rapid and efficient manner while minimizing the disadvantages of these prior art methods both mechanical and chemical.

One object of the present invention is to provide an improved method of treating underground sand containing formations to stabilize the incompetent formation. An additional object is to provide a fluid permeable consolidated formation sand between the loose formation sand and the well bore to prevent or to minimize the flow of unconsolidated sand particles therethrough while maximizing the flow of desired fluids and particularly petroleum hydrocarbons therethrough. A still further object is to provide a novel treating composition for use in stabilizing incompetent sand formations and to a method of placing same.

How these and other objects of the invention are accomplished will become apparent with reference to the accompanying disclosure. In at least one embodiment of the method of this invention at least one of the foregoing objects will be obtained.

It has now been discovered that an improved method of treating an incompetent sand containing underground formation comprises introducing into said formation a particular treating composition consisting essentially of a solution of acrolein dimer, an acid forming polymerization catalyst therefor, dissolved or dispersed in an organic solvent, contacting said composition in said formation with water in an amount sufficient to effect liberation of an acidic reacting group from said catalyst, and permitting the liberated acidic catalyst to polymerize the acrolein dimer and consolidate some of the formation sand. The resultant consolidated sand serves to prevent or to materially reduce the flow of the unsolidated sandy particles therethrough while permitting the flow of desirable formation fluids at a substantially unimpaired rate.

In carrying out the method of the present invention the treating composition is pumped down the well bore under sufficient pressure to force the composition into the unconsolidated formation adjacent to or in reasonable proximity to the well bore. When the composition is suitably placed in the formation to be consolidated the dimer is polymerized by the acidic reacting group formed from the catalyst in the solution on contact with the water present in the formation.

On polymerization the dimer component of the composition sets up and hardens and there is formed a fluid permeable consolidated sand that prevents or decreases the movement of sand particles therethrough into the well bore. After the dimer polymerizes and hardens, the well can be equipped for production, the formation fluids can be recovered therefrom by permitting these fluids to pass through the resulting formed consolidated sand in the formation into the well bore and recovered therefrom without the formation fluids being contaminated with the presence therein of unconsolidated sand particles.

The method of the present invention is particularly adaptable for use in any type of well completion but is generally used in a well wherein casing has been set and which has perforations therein at the desired intervals behind which the unconsolidated formation sands are located. Packers can be initially set above and below the perforated intervals to prevent the treating composition from passing into the nonisolated portions of the well and also to permit buildup of sufficient pressures on the said composition to force same through the perforations and into the formation without plugging up the well bore. After the treating composition has been forced through the casing perforations and into the unconsolidated sand formation and after the composition has come in contact with formation water to liberate the acid forming catalyst of the composition to effect polymerization of the dimer component, the well is usually closed in for a suitable period of time to permit the polymer to set and harden.

The treating composition useful in the method of the present invention must meet certain specific requirements. The concentration of acrolein dimer present in the treating composition can vary from about 2 to 25 percent by volume, with excellent results being obtained at concentrations of between 5 and 20 percent and particularly at about 10 percent for the most effective results. Amounts above about 25 percent of the dimer are to be avoided because the rate of polymerization is difficult to control. Concentrations below about 2 percent are not desirable because the consolidation is weak in compressive strength.

The solvent component should be of the aromatic type to effect solubilization of the dimer. Representative solvents include kerosene and diesel oil fractions of petroleum crudes. Selected petroleum fractions have been found suitable as the solvent component such as a kerosene or diesel fraction having a cetane number of at least about 45, an IBP of about 310 and an EP of about 530°F. or a naphthalene petroleum fraction from a topped catalytic reformate bottoms cut having an API Gravity of about 20°, an IBP of about 370 and an EP of about 750°F. Optionally one can incorporate a minor amount of a second solvent an oxygenated hydrocarbon solvent such as acetone to the composition in an amount of 1—10 percent by volume of the total solution. The presence of the second solvent aids in reducing the precipitation of the polymerized dimer from the principal aromatic solvent because of the solubility of the polymer in the acetone component. In addition the presence of the second solvent assists in removing water from the sand and retards deposition of the polymer.

The net effect of the second solvent is to increase the volume and permeability of the consolidation area with a resultant reduction in compressive strength.

The catalyst for the treating composition must be one that on contact with water or a water-wet surface will liberate an acid to effect polymerization of the acrolein dimer. Representative catalysts include inorganic acid halides such as thionyl chloride or sulfonyl chloride, organic acid halides such as benzoyl chloride, and benzenesulfonyl chloride. One may also use dimethyl- or diethyl-sulfate as the catalyst. The halosilanes such as dichlorodimethylsilane or other chlorosilanes such as silicon tetrachloride are satisfactory catalysts. Preferred catalysts are benzoyl chloride and benzenesulfonyl chloride or mixtures of either with thionyl chloride.

Use of benzenesulfonyl chloride as the catalyst permits polymerization and consolidation of the sand particles in from about 1 to 3 hours at 140°F. With silicon tetrachloride, dimethyldichlorosilane, thionyl chloride and the like, one attains more rapid consolidation without the application of heat, but the size and permeability of the consolidation per given volume of consolidation fluid is reduced.

One can also employ mixed catalysts that would provide additional advantages in operations, i.e. with the rapid catalyst, polymerization of part of the acrolein dimer would take place at the perforations of the borehole and with the slower catalyst polymerization of the remaining portion of the acrolein dimer would occur out in the formation away from the well bore. By this method, one could thereby move the treating equipment from the well site before complete polymerization and curing of the polymer took place with a resultant saving of equipment waiting time.

The solvent soluble type catalysts are employed in amounts of from about 0.05 to 1.5 percent by volume, preferably 0.1 to 0.7 percent by volume of the treating solutions.

One can incorporate the catalyst in the treating composition or one can inject the dimer solution into the desired position adjacent the sands to be consolidated, then contacting the dimer with the catalyst to effect polymerization of the dimer in the presence of water from the formation.

The treating solution of the present invention is employed in the following manner.

The solution containing the acrolein dimer in solution in the solvent, with or without the polymerization catalyst is introduced into the borehole and then placed adjacent to the unconsolidated sand particles in the formation to be consolidated. If the catalyst is in the treating solution, it is triggered by the water content of the formation.

Rates of injection of the treating solution and the catalyst may vary from about 1 to about 3 gallons per minute per perforation. An injection rate of about 1.5 to 2.5 gallons is highly desirable.

Following is a description by way of example of the method of the present invention. In the examples the test procedure used is described below.

TEST PROCEDURE

The method of the present invention was evaluated in a test chamber, shaped in the form of a truncated cone, measuring approximately 22 inches in height, and 18—20 inches in diameter, formed from a section of steel pipe. The chamber had an internal volume of 3.1 cubic feet. One end of a high pressure hose is connected to a removable steel fitting extending approximately 5 inches into the chamber. The other end was connected to the discharge end of a pump having an output of up to 10 gallons per minute at 225 p.s.i.g. The intake side of the pump was connected to various supply vessels by 1-inch diameter steel pipe equipped with associated feeder pipes and valves. The discharge end of the test chamber is fitted with a removable cover arranged to allow easy passage of fluid therethrough while retaining sand particles therein.

The procedure used in the evaluation was as follows:
1. The test chamber was hand packed with 80—120 mesh Ottawa grade sand and the test cover put in place.
2. Sand laden water was pumped through the cell to further pack the chamber and compact the sand. Pumping was continued until a pressure build-up of 20—40 p.s.i. was indicated at the pump with a throughput of 5—10 gallons of water per minute.
3. The test chamber was heated to the selected test temperature by circulating heated water therethrough.
4. Hot diesel oil was then passed through the chamber to remove excess water and to simulate a water-wet oil saturated formation sand.
5. The test solution was passed into the chamber at a rate of about 2 gallons per minute, until all of it was introduced into the chamber.
6. On occasion an after flush of about one pore volume (approximately 7 gallons) of diesel oil was passed into the chamber to improve permeability.
7. The treated sand was permitted to set for 0.5—72 hours. The treated sand was then removed from the chamber, split longitudinally, and cores taken therefrom for strength and water permeability measurements.

EXAMPLE 1

Following the test procedure set forth above, acrolein dimer in an amount of 2 gallons was admixed with 18 gallons of an aromatic petroleum solvent having an initial boiling point of 390°F. and injected with 121 ml. (0.032 gallon) of thionyl chloride catalyst into the test chamber. After a setting time of about 18 hours, the sand pack was removed and cored at various points to determine permeability and compressive strength of the samples. One sample (2s) 2 inches from the injection tube and at right angles thereto was found to have a permeability of 4.70 darcies, and a compressive strength of 2330 p.s.i. Another sample (2d) 2 inches from the end of the injection tubing and in line therewith was found to have a permeability of 1.99 darcies and 2740 p.s.i. compressive strength. A sample (8d) 8 inches from and in line with the injection tubing had a permeability of 4.92 darcies 1539 p.s.i. compressive strength. Another sample (9d) 1 inch further away (9 inches) had a permeability of 5.68 darcies and a compressive strength of 1050 p.s.i.

EXAMPLE 2

In other test one gallon of acrolein dimer, 9 gallons of the same aromatic solvent and 100 ml. (0.026 gallon) of the thionyl chloride catalyst and 0.25 gallon of acetone were injected into the test chamber.

Cores taken from the consolidated sand showed the following results.

The samples (2s, 4s) 2 and 4 inches, respectively, from the injection chamber and at right angles thereto showed permeability of 9.56 and 6.42 darcies, respectively, and compressive strengths of 2230 and 2290 p.s.i., respectively.

A sample (2d) 2 inches from the end of the injection tubing and in line therewith had a permeability of 4.87 darcies and 2020 p.s.i. compressive strength. A sample (4d) 4 inches from the end of the injection tubing had a permeability of 5.39 darcies, 2330 p.s.i. compressive strength. A sample (5d) 5 inches away showed 4.78 darcies permeability and 2180 p.s.i. compressive strength while another sample (6d) 1 inch further away had a permeability of 4.56 darcies, and 2230 p.s.i. compressive strength. A sample (9d) 9 inches away had 4.13 darcies permeability and 1050 p.s.i. in compressive strength.

When one desires to attain superior compressive strength in the consolidated sand formation, it is advantageous to employ a silane bonding agent such as gamma-glycidoxypropyltrimethoxysilane in the dimer treating composition. This material functions to improve the surface adhesion of the dimer to the sand grains so that the resultant polymer also has improved adhesion to these grains. The result is improved compressive strength in the consolidated sand. This material or other silane bonding agents of similar type is used in an amount of from about 0.15 percent to 0.25 percent by volume of the dimer solution, preferably about 0.17 percent by volume.

Obviously, many modifications and variations of the invention as hereinbefore set forth may be made without departing from the spirit and scope thereof and therefore only such limitations should be imposed as are indicated in the appended claims.

I claim:

1. A method of treating an oil-containing incompetent formation penetrated by a well bore to prevent the movement of unconsolidated sand particles from said incompetent formation to the well bore as the oil is recovered from said formation which comprises injecting a treating composition comprising from 2 to 25 percent by volume of acrolein dimer and 75 to 98 percent by volume of an aromatic type solvent, into said incompetent formation, polymerizing the acrolein dimer by a catalyst capable of liberating an acidic reacting group on contact with water in said formation, permitting the polymerized dimer to set and form a fluid permeable consolidated sand, and recovering oil from said formation through said formed consolidated sand.

2. Method as claimed in claim 1 wherein the treating composition comprises from 5 to 20 percent by volume of acrolein dimer and 80 to 95 percent by volume of an aromatic type solvent.

3. Method as claimed in claim 1 wherein the treating composition comprises from 8 to 12 percent by volume of acrolein dimer and 88 to 92 percent of an aromatic type solvent.

4. A method as claimed in claim 1 wherein from 1 to 10 percent by volume of the composition is an oxygenated hydrocarbon solvent.

5. A method as claimed in claim 1 wherein the treating composition also contains from 0.05 to 1.5 percent by volume of a catalytic material capable of reacting with water to liberate an acid reacting group to polymerize said acrolein dimer.

6. A method as claimed in claim 1 wherein said catalyst is selected from the group consisting of benzoyl choloride, benzenesulfonyl chloride and thionyl chloride.

7. A method as claimed in claim 1 wherein the treating composition contains from 0.15 percent to 0.29 percent by volume of gamma-glycidoxypropyltrimethoxysilane as a bonding agent.